March 18, 1941.  W. A. OEHLSCHLAGER  2,235,036
RAILWAY TRAFFIC CONTROLLING APPARATUS
Filed July 12, 1940
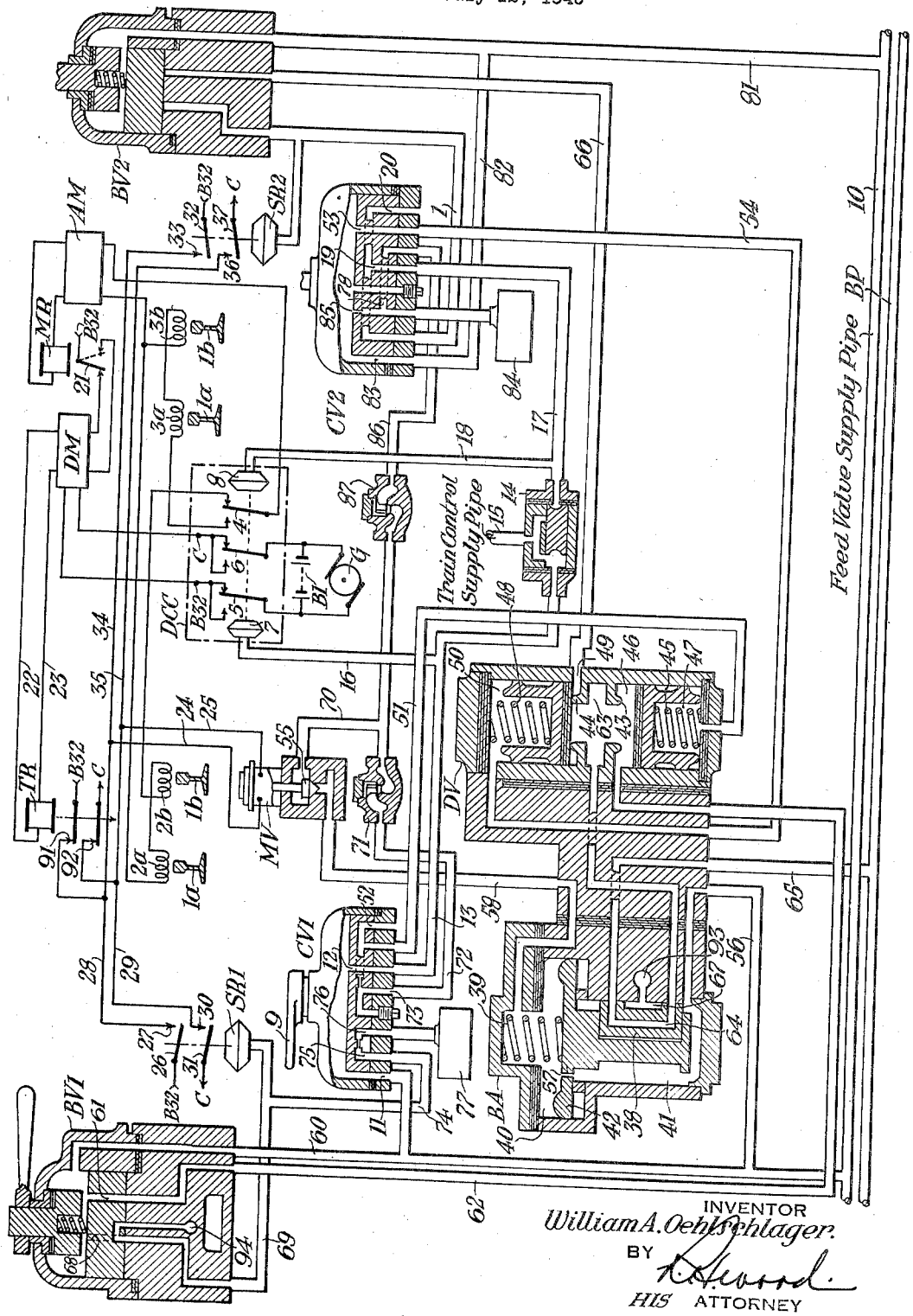
INVENTOR
*William A. Oehlschlager.*
BY
*HIS* ATTORNEY Patented Mar. 18, 1941

2,235,036

UNITED STATES PATENT OFFICE 2,235,036

RAILWAY TRAFFIC CONTROLLING APPARATUS

William A. Oehlschlager, Penn Township, Allegheny County, Pa., assignor to The Union Switch & Signal Company, Swissvale, Pa., a corporation of Pennsylvania Application July 12, 1940, Serial No. 345,127

14 Claims. (Cl. 246—63)

My invention relates to railway traffic controlling apparatus, and more particularly to train carried train control apparatus governed by energy received from the track rails.

Train carried train control apparatus governed by energy received from the track rails is in general use. Such energy is preferably coded at different preselected code rates and is inductively received on a train through the medium of inductors mounted on the train in inductive relation to the track rails. It is common practice to provide two such inductors one over each rail and to connect the two inductors together in such a manner that electromotive forces induced therein due to current flowing in the rails in opposite directions at any given instance add their effects. When the vehicle of the train on which such train control apparatus is located is a double end car or locomotive equipped for operation of such vehicle either end first, then inductors are mounted ahead of the wheels at each end of the vehicle and directional means is provided wherewith the inductors at the leading end of the vehicle only are effective.

The resultant electromotive force thus received on the train is preferably applied to the input side of an electron tube amplifier or detector for operation of a master code following relay. The master relay selectively governs decoding means according to the code rate of the energy received from the rails and such decoding means in turn controls either or both cab signals and train brake control equipment with the result a different cab signal indication is displayed and a respective brake control condition is effected for each different code rate of the received energy, the different code rates usually reflecting different traffic conditions in advance of the train. When automatic brake control equipment is provided, such brake control equipment is usually interlocked with the standard manual brake control equipment in such a manner that an automatic brake application can be suppressed or forestalled by the train operator taking suitable action to make a brake application through the usual manual brake valve. Furthermore, in order that a locomotive or vehicle equipped with such train control apparatus may be used as a trailing vehicle or as a helping locomotive and the train brakes controlled from a leading locomotive, the double heading valves are preferably interlocked with the automatic train control equipment.

In view of the above recited operating characteristics for train carried train control apparatus, an object of my invention is the provision of novel and improved directional means wherewith the energy receiver or inductors mounted at the end of the vehicle at which the master controller and manual brake valve are conditioned for governing the vehicle are automatically connected to the train carried amplifier and the energy receiver at the other end of the vehicle is disconnected therefrom.

A further object of my invention is the provision of novel and improved suppression means wherewith a brake application through the medium of the automatic brake application valve is suppressed if the train operator takes suitable action to make brake application through the manual brake valve.

Again, an object of my invention is the provision of novel and improved interlocking means between the manual brake valves of a vehicle or locomotive adaptable of operation either end first and the automatic brake control equipment and wherewith such locomotive may be conditioned for use as a second locomotive, that is for double heading.

Still another feature of my invention is the provision of novel and improved means wherewith a train or car of the multiple-unit type operable from either end will not be left without the brakes applied when the motorman or operator leaves one end of the train and takes his position at the other end for operation of the train from the last mentioned end. Such means also insures that the double heading valve will be set according to the manual brake valve in control of the train brakes before the train can proceed.

The above objects as well as other advantages of my invention which will become apparent as the specification progresses are attained according to my invention by the provision of a pneumatically actuated directional circuit controller, two cut-out valves one at each end of the vehicle, two suppression switches one at each end of the vehicle and a brake application valve having a remote controlled double heading valve portion, together with suitable piping, check valves and circuits.

The directional circuit controller is biased to a mid position and is actuated to one or the other of two extreme positions by means of two pneumatic relays each of which is pipe connected to a selected one of two cut-out valves. The two cut-out valves are preferably located one at each end of the vehicle and each is placed in a predetermined relationship with the manual brake valve and master controller located at the same end of the vehicle. Each cut-out valve serves to control the pressure supplied to the automatic train control apparatus and to the directional circuit controller and also serves to remotely govern the double heading valve portion of the automatic brake application valve. These cut-out valves are provided with a handle removable in the cut-out position only of the valve. With the handle in place the valve can be rotated between a cut-out position and a cut-in position. When the vehicle is to be operated with a particular end first, the operator places the handle on the cut-out valve for that end of the vehicle and moves the valve to its cut-in position. When either cut-out valve is thus rotated to its cut-in position, the air pressure supply of the vehicle is connected to the supply pipe for the automatic train control apparatus, and to a respective one of the pneumatic relays of the directional circuit controller. The circuit controller is thus operated automatically to a respective extreme position at which the energy receiver or inductor at the corresponding end of the vehicle is connected to the amplifier.

The directional controller also governs the connection of the train carried current source to the circuits of the automatic train control apparatus, the connection being opened at the biased or mid position of the directional controller and closed at each of its two extreme positions. Hence in making preparation for operating the vehicle the cut-out valve handle is placed on the cut-out valve for the leading end of the vehicle and the valve rotated to its cut-in position.

When the motorman changes ends from which the vehicle is to be controlled and in so doing removes the handle from the cut-out valve at the end he is leaving, an automatic brake application is incurred because the directional controller is without pressure and takes its biased position where the current source is disconnected from the circuits of the train control apparatus and the apparatus is deenergized to apply the brakes. The cut-out valves are so interlocked with the manual brake valves that this automatic application of the train brakes can be avoided by the operator placing the manual brake valve at its service position prior to moving the cut-out valve to its cut-out position.

Each of the suppression switches is operated by a respective pneumatic relay which is pipe connected to the manual brake valve of the corresponding end of the vehicle. The rotary of each manual brake valve is provided with special ports through which pressure is supplied to the respective suppression switch when the manual brake valve is set at a brake application position and through which ports the suppression switch is exhausted to atmosphere when the brake valve is set at the lap, holding or release position. Each of the suppression switches controls an alternative circuit for the magnet valve which governs the automatic brake application valve. Hence when the train control apparatus is conditioned to open the normal energizing circuit of the magnet valve, the magnet valve can be maintained energized over an alternative circuit and an automatic brake application suppressed by the train operator actuating the manual brake valve to a brake application position.

The remote controlled double heading valve portion of the automatic brake application valve is controlled by the cut-out valves in such a manner as to establish or interrupt the connections between the manual brake valves and the train brake pipe according to the condition of the cut-out valves. When a cut-out valve is set at its respective cut-in position, a corresponding valve of the double heading valve portion is opened to connect the brake pipe to the manual brake valve located at the same end of the vehicle as that cut-out valve, and when such cut-out valve is set at its cut-out position this valve of the double heading valve portion is closed to interrupt the connection between the associated manual brake valve and the brake pipe. Hence when both cut-out valves are set at their respective cut-out positions, neither manual brake valve of the vehicle is effective to control the pressure of the brake pipe and the vehicle may be operated as a trailing vehicle or as a helping locomotive.

I shall describe one form of apparatus embodying my invention, and shall then point out the novel features thereof in claims.

The accompanying drawing is a diagrammatic view showing one form of apparatus embodying my invention when used with the train carried train control apparatus of a vehicle equipped for operation either end first.

Referring to the drawing, a manual brake valve BV1 is placed at a first end of the vehicle on which the apparatus is mounted for governing the train brakes when the vehicle is to be operated with such first end as the leading end. A second manual brake valve BV2 is placed at the other or second end of the vehicle for governing the train brakes when the vehicle is operated with such second end as the leading end. These manual brake valves BV1 and BV2 would be of the standard type except to be provided with certain additional ports, to be later explained, and these brake valves need be described only insofar as to explain their structure as it relates to the apparatus embodying my invention.

It is also understood of course that brake valves BV1 and BV2 are each associated with a master controller, and other equipment necessary for controlling the motive power of the vehicle, such power control equipment being not shown for the sake of simplicity since it forms no part of my invention.

Two energy receivers are mounted on the vehicle one at each end and as here shown such receivers are inductors, a first pair of inductors 2a and 2b being mounted at the first end of the vehicle ahead of the leading wheels in inductive relation to the track rails 1a and 1b, respectively; and a second pair of inductors 3a and 3b being mounted at the second end of the vehicle ahead of the leading wheels in inductive relation to the track rails 1a and 1b, respectively. Inductors 2a and 2b are connected together in such manner that current flowing in opposite directions in the two track rails induces electromotive forces in the inductors that add their effects. Likewise, inductors 3a and 3b are connected together so that the electromotive forces induced therein by current flowing in opposite directions in the rails add their effects. It follows that when the vehicle is operated with the first end as the leading end, coded alternating current flowing in the track rails induces electromotive force of a corresponding code in inductors 2a and 2b, and when the vehicle is operated with the second end as the leading end then such track circuit current induces in inductors 3a and 3b an electromotive force of a code corresponding to that of the track circuit current.

The form of trackway apparatus for supplying such coded current to the track rails is immaterial and may be that covered by Letters Patent of the United States No. 1,986,679, granted January 1, 1935 to L. V. Lewis for Railway traffic controlling apparatus, and wherein alternating current is coded or periodically interrupted at the code rates of 180, 120 and 80 cycles per minute according to clear, approach restrictive and approach traffic conditions, respectively, a fourth condition of slow speed being also reflected by the absence of such coded current.

Inductors 2a and 2b and inductors 3a and 3b are connected to the input side of an amplifier AM according to the position of a contact member 4 of a directional circuit controller DCC, the arrangement being such that when contact member 4 occupies its right-hand position, that is, the position illustrated in the drawing, the inductors 2a and 2b are connected to the amplifier, but that when contact member 4 occupies its left-hand position, that is, the position opposite that illustrated in the drawing, inductors 3a and 3b are connected to the amplifier.

The vehicle is provided with a suitable source of current, here shown as a generator G and a battery B1. The generator G is driven by any convenient device such as a motor, not shown, and generates direct current of a suitable voltage, such as 32 volts. Battery B1 is associated with generator G and serves as a stand-by source of current. Generator G and battery B1 are connected to two terminals B32 and C over contact members 5 and 6 of the directional circuit controller DCC, current for the various circuits of the train control apparatus being derived from terminals B32 and C. When contact members 5 and 6 occupy either a right-hand or a left-hand position as shown in the drawing, the connections of generator G and battery B1 to terminals B32 and C are closed, but when contact members 5 and 6 occupy a mid or biased position, that is a position midway between the right-hand and left-hand positions, the generator G and battery B1 are disconnected from the terminals B32 and C.

The directional circuit controller DCC is preferably pneumatically actuated and in the form here disclosed it is actuated by two pneumatic relays 7 and 8 which are preferably of the well-known spring biased diaphragm operated type. When both relays 7 and 8 are without pressure contact members 4, 5 and 6 of the controller are held at the mid position due to the biasing action of the respective springs of the relays. When pressure is supplied to the diaphragm chamber of relay 7 in a manner to be shortly explained, contact members 4, 5 and 6 are actuated to the right-hand position connecting inductors 2a and 2b to the amplifier and the source of current to the terminals B32 and C. When pressure is supplied to the diaphragm chamber of relay 8, then contact members 4, 5 and 6 are moved to the left-hand position connecting inductors 3a and 3b to the amplifier, and the current source to the terminals B32 and C.

The reference characters CV1 and CV2 designate two cut-out valves, valve CV1 being preferably located at the first end of the vehicle and associated with manual brake valve BV1 and its corresponding master controller, and valve CV2 being located at the second end of the vehicle and associated with manual brake valve BV2 and its associated master controller. Each of these cut-out valves is constructed in such a manner that a handle 9 (see valve CV1) can be placed on or removed from the valve only when the valve is moved to a cut-out position. With the handle 9 in place, each valve can be rotated between such cut-out position and a cut-in position, valve CV1 being illustrated at the cut-in position and valve CV2 being illustrated at the cut-out position. In other words, the valve CV1 as shown in the drawing is set at its cut-in position for the vehicle to be operated with the first end as the leading end. Looking at valve CV1 which is set at its cut-in position, pressure is supplied from the usual feed valve supply pipe 10 through pipe 60 and ports 11 and 12 of valve CV1 to pipe 13 and thence through a double check valve 14 to a supply pipe 15 for the automatic train control apparatus. Pressure also flows from pipe 13 through pipe 16 to the diaphragm chamber of pneumatic relay 7 of direction circuit controller DCC and the contact members 4, 5 and 6 are shifted to the right-hand position. Looking at valve CV2 which is set at its cut-out position, the diaphragm chamber of pneumatic relay 8 of direction circuit controller DCC is connected through pipes 18 and 17 and ports 19 and 20 of valve CV2 to atmosphere and the pressure in pneumatic relay 8 is exhausted. In the event the valve CV1 is set at its cut-out position the port 12 is blanked shutting off the supply of pressure to pipe 13 and the chamber of pneumatic relay 7 is connected to atmosphere through pipes 16 and 13 and ports of valve CV1 similar to ports 19 and 20 of valve CV2, and the pneumatic relay 7 is without pressure. Also when valve CV2 is set at its cut-in position for the vehicle to be operated with the second end as the leading end, ports of the valve similar to ports 11 and 12 of valve CV1 complete a connection from feed valve supply pipe 10 through pipes 81 and 82 to pipe 17 and pressure from pipe 10 is supplied to the supply pipe 15 of the automatic train control apparatus through the double check valve 14 and at the same time through pipe 18 to the diaphragm chamber of pneumatic relay 8 causing contact members 4, 5 and 6 of the directional circuit controller to be operated to the left-hand position. Additional functions of the cut-out valves CV1 and CV2 will be explained hereinafter.

The amplifier AM may be any one of several well-known forms and is shown conventionally for the sake of simplicity. It is sufficient for the instant application to point out that a code following relay MR connected to the output side of amplifier AM is operated at a rate corresponding to the code rate of the energy picked up from the track rails by the inductors 2a—2b or 3a—3b and applied to the input side of the amplifier. Code following relay MR is provided with a contact member 21 and causes current corresponding in code to the rate at which relay MR is operated to be supplied to a decoding means DM. This decoding means and train control apparatus governed thereby may take different forms and preferably are those disclosed in a copending application for Letters Patent of the United States Serial No. 345,148, filed July 12, 1940, by F. H. Nicholson and H. W. Bryan for Railway traffic controlling apparatus, and to which copending application reference is made for a full understanding of the selective control of the decoding means for governing cab signals and train brake control equipment according to the code rate of the energy received from the track rails. It is sufficient for this application to point out that a slow release timing relay TR is connected to the decoding means over a circuit including wires 22 and 23 and relay TR is energized and picked up in response to energy of the 180, 120 or 80 code rate but that relay TR is deenergized in response to the absence of such coded current and is released at the end of its slow release period. As fully explained in the above mentioned application Serial No. 345,148, the timing relay TR is also deenergized when the train speed exceeds a speed prescribed for each of the different code rates of the track circuit current. The slow release period of relay TR serves as a delay or warning period between the deenergizing of relay TR and the initiation of an automatic brake application and which delay period may be of the order of 2.5 seconds. Relay TR controls at its front contacts 91 and 92 a normal energizing circuit for a magnet valve MV, the circuit extending from terminal B32 of the current source over front contact 91 of relay TR, wire 24, winding of magnet valve MV, wire 25 and front contact 92 of relay TR to terminal C of the current source.

Magnet valve MV controls the operation of an automatic brake application valve BA, the arrangement being such that an automatic application of the train brake follows the deenergization of magnet valve MV. As explained above magnet valve MV is provided with a normal energizing circuit which includes front contacts of relay TR. Two alternative circuits are provided for magnet valve MV, a first one of which extends from terminal B32 over contact member 26 of a suppression switch SR1 to be referred to later, contact 27, wires 28 and 24, winding of magnet valve MV, wires 25 and 29, contact 30, a second contact member 31 of switch SR1 and to terminal C. The second alternative circuit includes terminal B32, contact member 32 of a second suppression switch SR2 to be later described, contact 33, wires 34 and 24, winding of magnet valve MV, wires 25 and 35, contact 36, a second contact member 37 of switch SR2 and terminal C. It is to be seen therefore that magnet valve MV is energized when relay TR is picked up and is deenergized when relay TR is released unless one or the other of the suppression switches SR1 or SR2 is operated to close the respective alternative circuit of magnet valve MV.

Suppression switches SR1 and SR2 are alike and are of the pneumatic relay type. When pressure is supplied to the diaphragm chamber of relay SR1, the two contact members 26 and 31 are raised to engage contact members 27 and 30, respectively, and when the pressure of the diaphragm chamber is exhausted the biasing means of the relay forces the contact members 26 and 31 downward as viewed in the drawing out of engagement with the respective contacts 27 and 30. In like fashion when pressure is applied to the diaphragm chamber of switch SR2 the contact members 32 and 37 are raised to engage contacts 33 and 36, respectively, and when the pressure of the diaphragm chamber is exhausted the biasing spring forces contact members 32 and 37 out of engagement with the respective contacts 33 and 36. The manner of controlling the supply of pressure to the suppression switches SR1 and SR2 will be referred to when the operation of the apparatus is described.

The brake application valve BA may be of the usual construction and is provided with a slide valve 38 which is biased by a spring 39 to a release position when equal pressure exists in both the spring chamber 40 and valve chamber 41, but that when the pressure of spring chamber 40 is suddenly reduced the pressure of valve chamber 41 forces the piston 42 upward as viewed in the drawing against the force of spring 39 and slide valve 38 is moved to a brake application position.

A double heading valve portion DV is attached to the brake application valve BA. The double heading valve portion DV is provided with a first valve 43 associated with brake valve BV1 at the first end of the vehicle and a second valve 44 associated with brake valve BV2 at the second end of the vehicle. Valve 43 is held closed by a biasing spring 45 and is forced open against the force of spring 45 when pressure is supplied to piston chamber 46 through pipe 62 in a manner to be shortly described unless a corresponding pressure is supplied to the spring chamber 47 through pipe 51. Likewise, valve 44 is held closed by a biasing spring 48, and is forced open against the force of spring 48 when pressure is supplied to chamber 49 through pipe 66 unless a corresponding pressure is supplied to spring chamber 50 through pipe 54. This double heading valve portion DV controls the connections between the manual brake valves BV1 and BV2 and the brake pipe BP in a manner shortly to appear.

In describing the operation of the apparatus, I shall assume that the handle 9 has been placed on valve CV1 and valve CV1 moved to its cut-in position to condition the train control apparatus for operation of the vehicle with the first end as the leading end. Valve CV1 when moved to its cut-in position causes pressure to be supplied from supply pipe 10 to the train control apparatus supply pipe 15 and to pneumatic relay 7 as explained hereinbefore. Relay 7 in turn actuates contact members 4, 5 and 6 of the controller DCC to the right-hand position connecting inductors 2a—2b to the amplifier and the current source to the terminals B32 and C for energizing the train control circuits.

I shall also assume that the handle has been placed on brake valve BV1 and that valve moved to a release position until sufficient pressure is registered by the associated gauge and valve BV1 is then subsequently operated to its lap and running positions. It is to be understood of course that cut-out valve CV2 is set at its cut-out position and the manual brake valve BV2 occupies its lap position as indicated in the drawing when the vehicle is to be operated with the first end the leading end. I shall further assume that current coded at the rate of 180, 120 or 80 is picked up from the track rails so that timing relay TR is energized and picked up closing front contacts 91 and 92 with the result magnet valve MV is energized over its normal circuit. With magnet valve MV energized to seat valve 55, pressure from supply pipe 10 flows through pipes 60 and 56 to valve chamber 41 of brake application valve BA, and thence through a port 57 to spring chamber 40 of the valve and pipe 58 to magnet valve MV, the pressure being blanked at valve 55 of the magnet valve. Hence the pressure equalizes in spring chamber 40 and valve chamber 41 of the brake application valve BA and the slide valve 38 is held at the release position, that is the position illustrated in the drawing.

When valve CV1 is rotated to its cut-in position, the spring chamber 47 of the double heading valve portion DV is exhausted to atmosphere through pipe 51 and port 52 of valve CV1. Since valve CV2 is set at its cut-out position pressure is supplied from supply pipe 10 through pipes 81 and 82, ports 83 and 53 of valve CV2 and pipe 54 to spring chamber 50 of valve DV and the corresponding valve 44 is held closed by the biasing force of spring 48 aided by the pressure in chamber 50.

A connection is formed from supply pipe 10 to brake pipe BP through brake valve BV1 and which connection includes pipe 60 to the top side of the rotary of valve BV1, port 61 of valve BV1, pipe 62, chamber 46 of the double heading valve portion DV, valve 43 held open by the pressure in chamber 46 against the force of spring 45 since the spring chamber 47 is now exhausted to atmosphere, chamber 63, port 64 of slide valve 38 of the brake application valve BA and pipe 65 to the brake pipe BP. Hence the pressure of brake pipe BP may be controlled by manual brake valve BV1 in the usual manner, it being understood that valve 43 of the double heading valve portion DV is held open under all control conditions of the brake pipe pressure.

In the event the control condition of the automatic train control apparatus changes so that relay TR is deenergized and released opening front contacts 91 and 92, magnet valve MV is deenergized and valve 55 is opened. Opening of valve 55 permits the pressure in spring chamber 40 to be reduced by being exhausted to atmosphere through pipe 58, valve 55, pipe 70, a check valve 71, pipe 72 and ports 73 and 52 of valve CV1. Such reduction in the pressure of spring chamber 40 of valve BA causes valve BA to be actuated to its brake application position where brake pipe BP is exhausted to atmosphere through pipe 65, port 67 of slide valve 38 of brake application valve BA and exhaust port 93.

Such automatic brake application of a train brake can be suppressed by the motorman or operator making a manual application of the brake through the medium of manual brake valve BV1. When valve BV1 is operated to a brake application position, pressure from the top side of the rotary flows through a port 68 shown by dotted lines and open only at a brake application position of valve BV1, and pipe 69 to the diaphragm chamber of suppression switch SR1 causing contact members 26 and 31 to be raised to engage the respective contacts 27 and 30 and closes the alternative circuit for magnet valve MV. It is to be pointed out that valve BV1 is provided with an exhaust port 94 through which pipe 69 and in turn the diaphragm chamber of switch SR1 are connected to atmosphere when valve BV1 occupies its lap, release and running positions. It is clear therefore that an automatic brake application can be suppressed by the operator making a brake application through the manual brake valve.

In the event it is desired to change ends and operate the vehicle with the second end as the leading end, the change would be effected in the following manner. The operator would first place the manual brake valve BV1 at the service position for a given interval, say, for example, an interval of 12 seconds. The service position of valve BV1 permits pressure to be supplied from the top side of the rotary through port 68 to pipe 69 and thence through pipe 74 and ports 75 and 76 of valve CV1 at its cut-in position to a reservoir 77, and reservoir 77 is charged with pressure. Pressure is also supplied of course to suppression switch SR1 but operation of switch SR1 at this time is immaterial and need not be further described.

Cut-out valve CV1 is next moved to its cut-out position and handle 9 is removed. Brake valve BV1 is then moved to the lap position and its handle removed. When valve CV1 is moved to its cut-out position pressure to relay 7 is exhausted and the directional circuit controller DCC is actuated to its mid position disconnecting the current source from the circuits of the train control apparatus with the result magnet valve MV is immediately deenergized. Although valve 55 of magnet valve MV is opened to connect spring chamber 40 of the brake application valve BA to pipes 70 and 72 the pressure stored in reservoir 77 flows through a port of cut-out valve CV1 similar to port 78 of cut-out valve CV2 to pipe 72 and the reduction of the pressure of the spring chamber 40 is limited with the result that the brake valve BA is retained at its release position. In case the operator should move valve CV1 to its cut-out position prior to operating the manual brake valve BV1 to the service position and charging reservoir 77, the deenergization of magnet valve MV to open valve 55 permits the pressure from spring chamber 40 to be reduced through pipes 70 and 72 and into reservoir 77 with the result the brake application valve BA is actuated to its application position. Consequently when the operator leaves the first end of the vehicle in preparation for preparing to operate the vehicle from the second end the train brakes are applied either by the operator placing valve BV1 at the service position or through the medium of the automatic brake application valve BA.

In the next step, the operator would place the handle on brake valve BV2 and set that valve at the release position until the proper pressure is registered by the associated gauge. Handle 9 is then placed on valve CV2 and valve CV2 is rotated to its cut-in position. With valve CV2 set at its cut-in position, pressure is supplied to the train control supply pipe 15 and pneumatic relay 8 in a manner previously explained, pressure in the diaphragm chamber of relay 8 actuating the directional circuit controller to its left-hand position where inductors 3a and 3b are connected to the amplifier and current is applied to the train control apparatus. Pressure also flows through pipe 66 to chamber 49 opening valve 44 of the double heading valve portion DV because spring chamber 50 is now exhausted to atmosphere through ports of valve CV2. Since valve CV1 must be operated to its cut-out position prior to the removal of handle 9 pressure is applied to the spring chamber 47 of valve portion DV and valve 43 is held closed by the action of spring 45 and the pressure in chamber 47. A connection is now formed between the brake pipe BP and the manual brake valve BV2, this connection including pipe 65, port 64 of slide valve 38, chamber 63 of the double heading valve portion DV, valve 44, Chamber 49, and pipe 66. Hence the pressure of brake pipe BP can now be controlled by brake valve BV2 in the usual manner. In the event relay TR is deenergized, while the vehicle is being operated with the second end as the leading end, magnet valve MV is deenergized to initiate an automatic brake application unless the operator actuates the manual valve BV2 to a brake application position and causes operation of suppression switch SR2 and closes an alternative circuit for magnet valve MV, it being understood valve BV2 controls switch SR2 through special ports similar to the ports provided for valve BV1 for controlling switch SR1.

In the event the vehicle is to be used as a trailing vehicle of the train, or as a helping unit, the cut-out valves CV1 and CV2 are both set at their respective cut-out positions. Looking at valve CV2 it is to be observed that its cut-out position permits pressure to be built up in a reservoir 84 by the connection for supply pipe 19 through pipes 81 and 82, port 83, a restricted port 85 and to reservoir 84. Pressure also flows through port 78 and pipe 86 up to a check valve 87, the other side of which check valve is connected to pipe 79 leading to the magnet valve MV. With valve CV1 set at its cut-out position pressure is built up in a similar manner in the reservoir 77, and in the pipe 72 leading to check valve 71 interposed in the pipe 70 leading to the magnet valve. Hence pressure in the spring chamber 40 of brake application valve BA equalizes with the pressure in the valve chamber 41 although magnet MV is deenergized and valve 55 open. Consequently brake application valve BA is held at its release position for operation of the vehicle as a trailing vehicle or as a helping power unit. Also with both valves CV1 and CV2 set at the cut-out position, pressure is applied to both spring chambers 47 and 50 of double heading valve portion DV and both valves 43 and 44 are held closed to close the connection between the brake pipe BP and the manual brake valves BV1 and BV2. It is to be seen, therefore, that under this condition of the apparatus, the brake valves BV1 and BV2 are ineffective to control the brake pipe pressure and the automatic brake application valve BA is held at its release position with the result the train brakes may be controlled by the leading power unit.

It is to be understood, of course, that the usual choke valves with restricted exhaust ports are associated with switches SR1 and SR2, and reservoirs 77 and 84 to avoid pressure being retained therein indefinitely.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In railway traffic controlling apparatus for use with train carried receiving means responsive to energy received from the track rails for governing train carried train control apparatus when the vehicle on which such apparatus is mounted is equipped for operation either end first, the combination comprising, an energy receiver mounted at each end of the vehicle in energy receiving relation to the track rails, a pneumatically actuated circuit controller having a contact member biased to a midposition and operable to either a right-hand or a left-hand position, a circuit including said contact member at its right-hand position to connect the receiver at one end of the vehicle to said receiving means, a circuit including said contact member at its left-hand position to connect the receiver at the other end of the vehicle to said receiving means, a first and a second valve provided for said one and said other end of the vehicle respectively and each operable to a cut-in position, means including said first valve at its cut-in position to supply pressure to said circuit controller which actuates it to its right-hand position, and means including said second valve at its cut-in position to supply pressure to said circuit controller which actuates it to its left-hand position.

2. In railway traffic controlling apparatus for use with train carried receiving means responsive to energy received from the track rails for governing train carried train control apparatus when the vehicle on which such apparatus is mounted is equipped for operation either end first, the combination comprising, an energy receiver mounted at each end of the vehicle in energy receiving relation to the track rails, a circuit controlling contact member operable to a first or a second position, means including said contact member at its first position to connect the receiver at one end of the vehicle to said receiving means and including said contact member at its second position to connect the receiver at the other end of the vehicle to said receiving means, a first and a second pneumatic relay operatively connected to said contact member for operating said member to its first or second positions according as said first or said second relay is supplied with pressure, a first and a second valve located at said one and said other end of the vehicle respectively and each rotatable to a cut-in position, means including said first valve at its cut-in position to supply pressure to said first relay, and means including said second valve at its cut-in position to supply pressure to said second relay.

3. In railway traffic controlling apparatus for use with train carried receiving means responsive to energy received from the track rails for governing train carried train control apparatus when the vehicle on which such apparatus is mounted is equipped for operation either end first, the combination comprising, an energy receiver mounted at each end of the vehicle in energy receiving relation to the track rails, a directional circuit controller biased to a mid position and operable to a first or a second extreme position according as a first or a second chamber is supplied with pressure, circuit means including a first position contact and a second position contact of said controller to selectively connect either the receiver at the first end of the vehicle or the receiver at the second end of the vehicle to said receiving means, a first and a second valve located at said first and second ends of the vehicle respectively and each rotatable to a cut-in position, and means including the cut-in position of said first valve to supply pressure to said first chamber of the directional circuit controller and including the cut-in position of said second valve to supply pressure to said second chamber of the directional circuit controller.

4. In railway traffic controlling apparatus for use with train carried receiving means responsive to energy received from the track rails for governing train carried train control apparatus when the vehicle on which such apparatus is mounted is equipped for operation either end first, the combination comprising, an energy receiver mounted at each end of the vehicle in energy receiving relation to the track rails, a directional circuit controller biased to a mid position and operable to a first or a second extreme position according as a first or a second chamber is supplied with pressure, a first and a second cut-out valve located at a first and a second end of the vehicle respectively and each rotatable to a cutout position and a cut-in position, means including the cut-in position of said first valve to supply pressure to said first chamber of the directional circuit controller, means including the cut-in position of said second valve to supply pressure to said second chamber of the directional circuit controller, circuit means including a first position contact of said circuit controller to connect the energy receiver at said first end of the vehicle to said receiving means and a second position contact of said circuit controller to connect the energy receiver at said second end of the vehicle to said receiving means, a current source, and circuit means including either a first position contact or a second position contact of said circuit controller to connect said current source to said train carried train control apparatus.

5. In railway traffic controlling apparatus for use with train carried receiving means responsive to energy received from the track rails for governing train carried train control apparatus when the vehicle is equipped for operation either end first, the combination comprising, an inductor mounted at each end of the vehicle in inductive relation to the track rails, a directional circuit controller biased to a mid position and operable to a first or a second position according as pressure is supplied to a first or a second chamber, a first valve located at a first end of the vehicle operable to a cut-in position to supply pressure to said first chamber, a second valve located at a second end of the vehicle operable to a cut-in position to supply pressure to said second chamber, circuit means including a first and a second position contact of said directional circuit controller to selectively connect said inductors to said receiving means according as said circuit controller is operated to its first or second position, a current source, and circuit means including either a first or a second position contact of said directional circuit controller to connect said current source to said train control apparatus.

6. In railway traffic controlling apparatus for use with train carried receiving means responsive to energy received from the track rails for governing train carried train control apparatus when the vehicle is equipped for operation either end first, the combination comprising, an inductor mounted at each end of the vehicle in inductive relation to the track rails, a directional circuit controller biased to a mid position and operable to a first or a second position according as pressure is supplied to a first or a second pneumatic relay, a double check valve, a supply pipe for said train control apparatus, a feed valve supply pipe, a first and a second valve each operable to a cut-out and a cut-in position, a first connection including said first valve at its cut-in position to supply pressure from the feed valve supply pipe through said check valve to the supply pipe of said train control apparatus, a second connection including said second valve at its cut-in position to supply pressure from the feed valve supply pipe through said check valve to said supply pipe for the train control apparatus, said first pneumatic relay connected to said first connection and said second pneumatic relay connected to said second connection to operate said directional circuit controller to its first or second position according as said first or second valve is set at its cut-in position, and circuit means including a first and a second position contact of said circuit controller to selectively connect said inductors to said receiving means.

7. In railway traffic controlling apparatus for use with train carried receiving means responsive to energy received from the track rails for governing train carried train control apparatus when the vehicle is equipped for operation either end first, the combination comprising, an inductor mounted at a selected end of said vehicle in inductive relation to the track rails, a circuit controller operable from a biased position to a given position according as pressure is supplied to or is exhausted from the diaphragm chamber of a pneumatic relay, a supply pipe for said train control apparatus, a source of air pressure on said vehicle, a magnet valve energized by a circuit governed by the train control apparatus and effective when deenergized to cause an application of the train brakes, a cut-out valve for said selected end of the vehicle and operable to either a cut-out or a cut-in position, a connection including said valve at its cut-in position to connect said source of air pressure to said supply pipe and said pneumatic relay, a connection including said valve at its cut-out position to connect said pneumatic relay to the atmosphere, and circuit means including a given position contact of said circuit controller to connect said inductor to the receiving means.

8. In railway traffic controlling apparatus for use with train carried receiving means mounted on a vehicle having a standard type manual brake valve for controlling the train brakes and which receiving means is responsive to energy received from a track circuit for governing a brake application valve through the medium of a magnet valve, the combination comprising, a slow release timing relay controlled by said receiving means and energized under one condition and deenergized under another condition of the receiving means, a normal circuit including a front contact of said timing relay to energize said magnet valve, a pneumatic relay biased to one position and operable to another position when pressure is supplied to the diaphragm chamber thereof, means including a port of the manual brake valve to supply pressure to such diaphragm chamber and effective only at a brake application position of the manual brake valve, and an alternative circuit including a contact of said pneumatic relay closed only at said other position thereof to retain energized said magnet valve and suppress an automatic application of the brakes when the manual brake valve is moved to a brake application position during the slow release period of said timing relay.

9. In railway traffic controlling apparatus for use with train carried receiving means mounted on a vehicle having a standard type manual brake valve for controlling the train brakes and which receiving means is responsive to energy received from a track circuit for governing a brake application valve through the medium of a magnet valve, the combination comprising, a slow release timing relay controlled by said receiving means and energized under one condition and deenergized under another condition of the receiving means, a normal circuit including a front contact of said timing relay to energize said magnet valve, a pneumatic relay biased to one position when its pressure chamber is exhausted to atmosphere and operable to another position when pressure is supplied to such pressure chamber, means including a port of the manual brake valve to supply pressure to said pressure chamber and effective only at a brake application position of the manual brake valve; means including another port of the manual brake valve to exhaust said pressure chamber to atmosphere and effective at the running position of the manual brake valve, and an alternative circuit including a contact of said relay closed at said other position thereof to energize said magnet valve.

10. In railway traffic controlling apparatus for use with train carried receiving means mounted on a vehicle of a train having a standard type manual brake valve for controlling the train brakes and which receiving means is responsive to energy received from a track circuit for governing a brake application valve through the medium of a magnet valve effective when energized to control such brake application valve to a release position and when deenergized to control that brake application valve to an application position, the combination comprising, a normal circuit including a current source and a contact governed by said receiving means to energize said magnet valve, a cut-out valve rotatable between a cut-out and a cut-in position, pneumatic actuated means controlled by said cut-out valve to connect said current source to said normal circuit when the cut-out valve is rotated to its cut-in position and to disconnect the current source from the circuit when the cut-out valve is rotated to its cut-out position, and means controlled by said manual brake valve to retain said brake application valve at its release position subsequent to deenergization of said magnet valve due to rotation of said cut-out valve to its cut-out position and effective only when said manual brake valve is moved to a brake application position while the cut-out valve occupies its cut-in position.

11. In railway traffic controlling apparatus for use with train carried receiving means responsive to energy received from a track circuit for governing a brake application valve to a release position or to an application position according as a magnet valve is energized or deenergized and which receiving means is mounted on a train vehicle having a standard type manual brake valve at each end thereof for controlling the train brakes according as to which end of the vehicle is the leading end, the combination comprising, a normal circuit including a current source and a contact governed by said receiving means to energize said magnet valve, two cut-out valves one for each end of the vehicle, each of said cut-out valves operable to a cut-out and a cut-in position, a circuit controller controlled jointly by said valves to connect said current source to said normal circuit only when one or the other of said valves occupies its cut-in position, and means controlled by each of said manual brake valves to retain said brake application valve at its release position subsequent to deenergization of the magnet valve and effective only when the manual brake valve is moved to a brake application position while the cut-out valve at the same end of the vehicle as that brake valve occupies its cut-in position.

12. In railway traffic controlling apparatus for use with train carried receiving means responsive to energy received from a track circuit for governing a brake application valve to a release position or to an application position according as a magnet valve is energized or deenergized and which receiving means is mounted on a train vehicle having a standard type manual brake valve at each end thereof for controlling the train brakes according as to which end of the vehicle is the leading end, the combination comprising, a normal circuit including a current source and a contact governed by said receiving means to energize said magnet valve, a double heading valve having a first valve interposed in the connection between the manual brake valve at a first end of the vehicle and the train brake pipe and a second valve interposed in the connection between the manual brake valve at the second end of the vehicle and the train brake pipe, two cut-out valves one for said first end and the other for said second end of the vehicle and each of such cut-out valves operable to a cut-out and a cut-in position, a circuit controller governed by said cut-out valves and operated to connect said current source to said normal circuit only when one or the other of the cut-out valves is set at its cut-in poistion, means controlled by the cut-in position of the cut-out valve at said one end of the vehicle to open the first valve of the double heading valve, and means controlled by the cut-in position of the cut-out valve at said second end of the vehicle to open the second valve of the double heading valve.

13. In railway traffic controlling apparatus for use with train carried receiving means responsive to energy received from a track circuit for governing a brake application valve to a release position or to an application position according as a magnet valve is energized or deenergized and which receiving means is mounted on a train vehicle having a standard type manual brake valve at each end thereof for controlling the train brakes according as to which end of the vehicle is the leading end, the combination comprising, a normal circuit including a current source and a contact governed by said receiving means to energize said magnet valve, a double heading valve having a first valve interposed in the connection between the manual brake valve at a first end of the vehicle and the train brake pipe and a second valve interposed in the connection between the manual brake valve at the second end of the vehicle and the train brake pipe, two cut-out valves one for said first end and the other for said second end of the vehicle and each of such cut-out valves operable to a cut-out and a cut-in position, a circuit controller controlled jointly by said cut-out valves to connect said current source to said normal circuit only when one or the other of the cut-out valves is set at its cut-in position, means controlled by the cut-in position of the cut-out valve at said one end of the vehicle to open the first valve of the double heading valve, means controlled by the cut-in position of the cut-out valve at said second end of the vehicle to open the second valve of the double heading valve, and means controlled by each of said manual brake valves to retain said brake application valve at its release position when said magnet valve is deenergized and effective only when the manual brake valve is moved to a brake application position when the cut-out valve at the same end of the vehicle as that brake valve occupies its cut-in position.

14. In railway traffic controlling apparatus for use with a vehicle provided with a manual brake valve at each end thereof for controlling the train brakes according as to which end of the vehicle is the leading end, the combination comprising, a cut-out valve at each end of the vehicle and each operable to a cut-in and a cut-out position; a double heading valve having a center chamber connected to the train brake pipe, a first valve controlling a connection between said center chamber and the manual brake valve at a first end of the vehicle and a second valve controlling a connection between said center chamber and the manual brake valve at the second end of the vehicle; and means controlled by said cut-out valves to open the first valve and close the second valve of the double heading valve when the cut-out valve at the first end of the vehicle is set at its cut-in position and the cut-out valve at the second end of the vehicle is set at its cut-out position, to open the second valve and close the first valve of the double heading valve when the cut-out valve at the second end of the vehicle is set at its cut-in position and the cut-out valve at the first end of the vehicle is set at its cut-out position, and to close both said first and second valves of the double heading valve when both cut-out valves are set at their cut-out positions.

WILLIAM A. OEHLSCHLAGER.